United States Patent
Nefzger et al.

(10) Patent No.: US 9,139,685 B2
(45) Date of Patent: *Sep. 22, 2015

(54) PROCESS FOR THE PREPARATION OF A POLYURETHANE POLYMER WITH SECONDARY HYDROXYL END GROUPS COMPRISING POLYESTER POLYOLS

(75) Inventors: Hartmut Nefzger, Pulheim (DE); Jörg Hofmann, Krefeld (DE); Bert Klesczewski, Köln (DE); Erika Bauer, Jüchen (DE); Klaus Lorenz, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 429 days.

This patent is subject to a terminal disclaimer.

(21) Appl. No.: 13/381,139

(22) PCT Filed: Jun. 29, 2010

(86) PCT No.: PCT/EP2010/003935
§ 371 (c)(1),
(2), (4) Date: Jan. 24, 2012

(87) PCT Pub. No.: WO2011/000546
PCT Pub. Date: Jan. 6, 2011

(65) Prior Publication Data
US 2012/0123008 A1    May 17, 2012

(30) Foreign Application Priority Data

Jul. 1, 2009   (DE) .......................... 10 2009 031 218

(51) Int. Cl.
| C08G 18/00 | (2006.01) |
| C08G 18/42 | (2006.01) |
| C08G 18/76 | (2006.01) |
| C08G 63/91 | (2006.01) |
| C08G 77/46 | (2006.01) |
| C08G 101/00 | (2006.01) |

(52) U.S. Cl.
CPC ........ *C08G 18/4291* (2013.01); *C08G 18/4241* (2013.01); *C08G 18/4261* (2013.01); *C08G 18/4263* (2013.01); *C08G 18/7621* (2013.01); *C08G 63/916* (2013.01); *C08G 77/46* (2013.01); *C08G 2101/005* (2013.01); *C08G 2101/0008* (2013.01); *C08G 2101/0083* (2013.01)

(58) Field of Classification Search
CPC ........... C08G 18/4241; C08G 18/4261; C08G 18/4263; C08G 18/4291
USPC ............ 528/80, 81, 83, 84, 85; 521/155, 157, 521/170, 172
See application file for complete search history.

(56) References Cited

U.S. PATENT DOCUMENTS

| 3,502,601 | A |   | 3/1970 | Case et al. |
| 4,144,395 | A |   | 3/1979 | Murphy et al. |
| 4,379,906 | A | * | 4/1983 | Chattha ........................... 528/75 |
| 4,647,595 | A |   | 3/1987 | Kozawa et al. |
| 4,845,266 | A | * | 7/1989 | Marx et al. ....................... 560/91 |
| 5,607,982 | A | * | 3/1997 | Heyman et al. .................. 521/67 |
| 5,684,116 | A |   | 11/1997 | Martl et al. |
| 6,331,577 | B1 |  | 12/2001 | Volkert et al. |
| 6,562,880 | B1 |  | 5/2003 | Doerge et al. |
| 6,753,402 | B1 |  | 6/2004 | Bauer et al. |
| 2009/0264546 | A1 | * | 10/2009 | Lysenko et al. ............... 521/126 |

FOREIGN PATENT DOCUMENTS

| CA | 2144465 A1 | 9/1995 |
| DE | 28 49 549 A1 | 6/1979 |
| DE | 36 13 875 A1 | 10/1987 |
| DE | 19949091 A1 | 4/2001 |
| EA | 001624 | 6/2001 |
| EP | 0 010 805 A1 | 5/1980 |
| EP | 0086309 A1 | 8/1983 |
| GB | 1108013 A | 3/1968 |
| NL | 9201868 A | 5/1994 |
| RU | 2138518 C1 | 9/1999 |
| RU | 2342405 C2 | 12/2008 |
| WO | WO-9518839 A1 | 7/1995 |

* cited by examiner

*Primary Examiner* — Michael L Leonard
(74) *Attorney, Agent, or Firm* — Drinker Biddle & Reath LLP

(57) ABSTRACT

The invention relates to a process for the preparation of a polyurethane polymer, comprising the step of reaction of
A) polyester polyols with secondary hydroxyl end groups, which are obtainable from the reaction of a polyester comprising carboxyl end groups with an epoxide of the general formula (1):

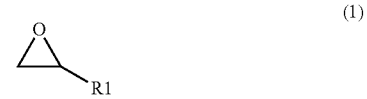

(1)

wherein R1 represents an alkyl radical or an aryl radical and wherein the polyester comprising carboxyl end groups has an acid number of from ≥25 mg of KOH/g to ≤400 mg of KOH/g and a hydroxyl number of ≤5 mg of KOH/g, with
B) polyisocyanates which are chosen from the group comprising toluoylene-diisocyanate, diphenylmethane-diisocyanate, polymeric diphenylmethane-diisocyanate, xylylene-diisocyanate, naphthylene-diisocyanate, hexamethylene-diisocyanate, diisocyanatodicyclohexylmethane and/or isophorone-diisocyanate. The invention furthermore relates to polyurethane polymers prepared by such a process.

16 Claims, No Drawings

PROCESS FOR THE PREPARATION OF A POLYURETHANE POLYMER WITH SECONDARY HYDROXYL END GROUPS COMPRISING POLYESTER POLYOLS

CROSS-REFERENCE TO RELATED APPLICATIONS

This application is a national stage application (under 35 U.S.C. §371) of PCT/EP2010/003935, filed Jun. 29, 2010, which claims benefit of German application 10 2009 031 218.8, filed Jul. 1, 2010, both of which are incorporated herein by reference in their entirety for all their useful purposes.

BACKGROUND

The invention relates to a process for the preparation of a polyurethane polymer, comprising the step of reaction of
A) polyester polyols with secondary hydroxyl end groups with
B) polyisocyanates which are chosen from the group comprising toluoylene-diisocyanate, diphenylmethane-diisocyanate, polymeric diphenylmethane-diisocyanate, xylylene-diisocyanate, naphthylene-diisocyanate, hexamethylene-diisocyanate, diisocyanatodicyclohexylmethane and/or isophorone-diisocyanate. The invention furthermore relates to polyurethane polymers prepared by such a process.

As a consequence of the α,ω-diols used for their build-up, polyester polyols which are industrially relevant for the preparation of polyurethane polymers contain primary hydroxyl end groups. The use of diols with completely or partially secondary hydroxyl end groups, such as, for example, 1,2-propylene glycol or dipropylene glycol, leads to polyester polyols which are approximately equipped, with respect to their end groups, like the diols from which they are built up. In the case of 1,2-propylene glycol, approximately 50% of the hydroxyl end groups would be secondary.

Diols which contain only secondary hydroxyl end groups, such as, for example, 2,3-butanediol, play no role on an industrial scale because of the amounts available on the market and the cost. An additional difficulty in the case of all diols containing secondary hydroxyl groups in polyester synthesis is that the rate of reaction with dicarboxylic acids is lower.

It is furthermore a particular disadvantage that as a consequence of the numerous short alkyl side groups, the properties of the polyurethanes prepared from such polyesters are significantly poorer than those of polyurethanes which are obtained from α,ω-diols. Conventional polyester polyols which are prepared with the diols mentioned with at least partially secondary hydroxyl end groups accordingly are both more expensive in production costs, in some cases more expensive in material costs, and also less suitable for the preparation of high quality polyurethanes. Polyester polyols with secondary hydroxyl end groups therefore have not hitherto had any relevant importance industrially, in contrast to polyether polyols.

It would be desirable to have available polyester polyols which contain α,ω-diol units within them and a unit with secondary hydroxyl end groups at their chain end. Such a structure would result in a reduced reactivity with respect to polyisocyanates and would make it possible, for example in the field of polyurethane flexible foams, also additionally to employ urethanization catalysts, such as tin salts, in addition to the amine catalysts, which chiefly drive the water reaction. In particular, as a result this opens up for the production of polyester polyurethane flexible foams the possibility widely used in the field of polyether polyurethane foams of better coordination of these two reactions with one another and of thereby obtaining, for example, processing advantages.

The functionalization of carboxyl groups in polyester polyol synthesis is disclosed in DE 36 13 875 A1. For the preparation of polyester polyols with an acid number of less than 1, a hydroxyl number of approximately 20 to approximately 400 and a functionality of expediently 2 to 3, polycarboxylic acids and/or anhydrides thereof and polyfunctional alcohols are subjected to a condensation reaction. This is advantageously effected in the absence of conventional esterification catalysts at temperatures of from 150° C. to 250° C. and optionally under reduced pressure. Polycondensation is carried out to an acid number of from 20 to 5 and the polycondensates obtained are then alkoxylated with 1 to 5 mol of alkylene oxide, for example 1,2-propylene oxide and/or preferably ethylene oxide, per carboxyl group in the presence of a tertiary amine. The tertiary amine is chosen from the group of N-methylimidazole, diazabicyclo[2,2,2]octane, diazabicyclo[5,4,0]undec-7-ene and pentamethyldiethylenetriamine. The catalyst is expediently employed in an amount of from 0.001 to 1.0% by weight, based on the weight of the polycondensate. The alkoxylation is advantageously carried out at temperatures of from 100° C. to 170° C. and under a pressure of from 1 to 10 bar.

In the process according to DE 36 13 875 A1, the esterification mixture is subjected to polycondensation to an acid number of from 20 to 5. It is stated as essential that the melt condensation is not interrupted too early. For example, if alkoxylation were to be carried out at an acid number of 25 or higher, the water content of the esterification mixture would be excessively high. This would result, however, in undesirable side reactions. If the synthesis of the polyesters is interrupted at an acid number of from 20 to 5, this means that a comparatively high content of terminal hydroxyl groups which originate from the alcohol component and are therefore as a rule primary is already present. The remaining carboxyl groups are then reacted with epoxides to shorten the synthesis time, terminal hydroxyl groups originating from the epoxides being obtained.

EP 0 010 805 A1 discloses a powder coating based on polyesters terminated by carboxyl groups, an epoxy compound and a choline compound of the formula [Y—CH$_2$—CH$_2$—N—(—CH$_3$)$_3$]$^+{}_n$X$^{n-}$, in which X is OR or —O—C(O)—R and R is hydrogen or a C$_{1-40}$ group and X$^{n-}$ is an anion. Preferably, Y is OH or a group —O—C(O)—R. These powder coatings are less susceptible to yellowing and nontoxic. According to this specification, however, the epoxy compound contains on average two or more epoxy groups per molecule. The epoxy compound serves here to crosslink polyester molecules with one another and not to build up OH-terminated polyester molecules.

DE 28 49 549 A1 discloses a process for the preparation of polyether polyester polyols by reaction of a polyether polyol with a polycarboxylic acid anhydride to give an acid half-ester. The acid half-ester is then reacted with an alkylene oxide to give a product with an acid number of less than 5 mg of KOH/g. The reaction of the alkylene oxide with the acid half-ester is carried out in the presence of from 50 to 100 ppm, based on the starting polyether polyol, of a trialkylamine having 2 to 4 carbon atoms in the alkyl chain. The polyol obtained, however, is still based on polyethers and not on polyesters.

There is consequently still the need for alternative preparation processes for polyurethane polymers. In particular,

DESCRIPTION OF EMBODIMENTS there is a need for such processes using polyester polyols with secondary hydroxyl end groups prepared by alternative routes.

The invention provides a process for the preparation of a polyurethane polymer, comprising the step of reaction of
A) polyester polyols with secondary hydroxyl end groups, which are obtainable from the reaction of a polyester comprising carboxyl end groups with an epoxide of the general formula (1):

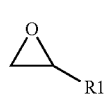

(1)

wherein R1 represents an alkyl radical or an aryl radical and wherein the polyester comprising carboxyl end groups has an acid number of from ≥25 mg of KOH/g to ≤400 mg of KOH/g and a hydroxyl number of ≤5 mg of KOH/g
with
B) polyisocyanates which are chosen from the group comprising toluoylene-diisocyanate (TDI), diphenylmethane-diisocyanate (MDI), polymeric diphenylmethane-diisocyanate (PMDI), xylylene-diisocyanate (XDI), naphthylene-diisocyanate (NDI), hexamethylene-diisocyanate (HDI), diisocyanatodicyclohexylmethane ($H_{12}$-MDI) and/or isophorone-diisocyanate (IPDI);
B2) prepolymers of the polyisocyanates mentioned in B1);
B3) allophanates, ureas, biurets, isocyanurates, uretdiones and/or carbodiimides of the polyisocyanates mentioned in B1); and/or
B4) carbodiimide/uretonimine derivatives of the polyisocyanates mentioned in B1).

The process according to the invention has the advantage that because of the lower rate of reaction of the secondary hydroxyl end groups in the polyester polyols employed, a wider band width of catalyst systems can be employed in the preparation of polyurethane polymers, such as polyurethane foams, and in particular polyurethane flexible foams. In particular, in some cases tin catalysts can be used as a substitute for amine catalysts. A lower content of amine catalysts has a favourable effect on properties such as the smell and resistance to ageing of the polyurethanes. Specifically, it has been found that a usable polyurethane flexible foam is also obtained with a commercially favourable isomer mixture of 2,4-TDI 2,6-TDI of 80:20 (T80).

The preparation of polyurethane prepolymers by reaction of polyols A) with the polyisocyanates B1), B2), B3) and/or B4) is expressly also included in the process according to the invention.

The acid number of the polyesters comprising carboxyl end groups can be determined with the aid of the standard DIN 53402 and can also be ≥30 mg of KOH/g to ≤300 mg of KOH/g or ≥50 mg of KOH/g to ≤250 mg of KOH/g. The hydroxyl number of the polyesters comprising carboxyl end groups can be determined with the aid of the standard DIN 53240 and can also be ≤3 mg of KOH/g or ≤1 mg of KOH/g.

Advantageously, the alcohol component from which the polyester comprising carboxyl end groups is built up is an α,ω-polyol, in particular an α,ω-diol or an α,ω-diol to the extent of at least 90 mol %.

All polyesters comprising carboxyl end groups are in principle suitable for reaction with the epoxide (1) as long as they meet the conditions of the acid and hydroxyl numbers according to the invention. These polyesters are also synonymously called polyester carboxylates. Polyester carboxylates can be prepared by polycondensation from low molecular weight polyols and low molecular weight polycarboxylic acids, including anhydrides thereof and alkyl esters thereof. Hydroxycarboxylic acids, including inner anhydrides thereof (lactones) can furthermore be used or co-used.

The polyester carboxylates which can be employed according to the invention have predominantly carboxyl end groups. The end groups can thus be, for example, carboxyl groups in a content of ≥90 mol %, of ≥95 mol % or of ≥98 mol %. In contrast, they contain hydroxyl end groups only in a very minor extent, as emerges from the hydroxyl numbers required according to the invention. Independently of that stated above, for example, the number of carboxyl end groups can exceed the number of secondary hydroxyl end groups ≥5-fold or even ≥10-fold. Suitable polyester carboxylates can have molecular weights in the range of from ≥400 Da to ≤10,000 Da, preferably from ≥450 to ≤6,000 Da. Likewise independently of that stated above, the number of carboxyl end groups in the polyester carboxylate can be 2, 3, 4, 5 or 6. The average functionality of the polyester carboxylates can be, for example, ≥2 to ≤3.

Low molecular weight polyols which can be employed for preparation of the polyester carboxylates are, in particular, those with hydroxyl functionalities of from ≥2 to ≤8. They have, for example, ≥2 to ≤36, preferably ≥2 to ≤12 C atoms. Generally, it is advantageous if the polyols are α,ω-polyols, in particular α,ω-diols or α,ω-diols to the extent of at least 90 mol %. Polyols from the group comprising ethylene glycol and diethylene glycol and higher homologues thereof, furthermore 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol and higher homologues thereof, furthermore 2-methylpropane-1,3-diol, neopentyl glycol, 3-methylpentane-1, 5-diol, furthermore glycerol, pentaerythritol, 1,1,1-trimethylolpropane and/or carbohydrates having 5 to 12 C atoms, such as isosorbide, are very particularly preferred.

1,2-Propanediol, dipropylene glycol and higher homologues thereof can furthermore likewise be employed.

Mixtures of polyols can of course also be employed, the polyols mentioned contributing at least 90 mol % of all the hydroxyl groups.

Low molecular weight polycarboxylic acids or acid equivalents thereof, such as, for example, anhydrides, which can be employed for preparation of the polyester carboxylates have, in particular, 2 to 36, preferably 2 to 12 C atoms. The low molecular weight polycarboxylic acids can be aliphatic or aromatic. They can be chosen from the group comprising succinic acid, fumaric acid, maleic acid, maleic anhydride, glutaric acid, adipic acid, sebacic acid, suberic acid, azelaic acid, 1,10-decanedicarboxylic acid, 1,12-dodecanedicarboxylic acid, phthalic acid, phthalic anhydride, isophthalic acid, terephthalic acid, pyromellitic acid and/or trimellitic acid.

Mixtures of low molecular weight polycarboxylic acids can of course also be employed, the polycarboxylic acids mentioned contributing at least 90 mol % of all the carboxyl groups.

If hydroxycarboxylic acids, including inner anhydrides thereof (lactones), are used or co-used, these preferably originate from the group of caprolactone or 6-hydroxycaproic acid.

The polycondensation is preferably carried out without a catalyst, but it can also be catalysed by the catalysts known to the person skilled in the art. The polycondensation can be carried out by the usual methods, for example at elevated temperature, in vacuo, as azeotrope esterification and by the nitrogen blowing process. To achieve the acid numbers and hydroxyl number envisaged according to the invention, the polycondensation is not interrupted at a particular stage, but is carried out with removal of the water formed up to a conversion of the OH groups of the alcohol which is as complete as possible, to form carboxyl end groups.

The epoxide of the general formula (1) is a terminal epoxide with a substituent R1, which can be an alkyl radical or an aryl radical. In connection with the overall invention, the term "alkyl" generally includes substituents from the group of n-alkyl, branched alkyl and/or cycloalkyl. In connection with the overall invention, the term "aryl" generally includes substituents from the group of mononuclear carbo- or heteroaryl substituents and/or polynuclear carbo- or heteroaryl substituents. The molar ratio of epoxide to carboxyl end group in the process according to the invention can be, for example, in a range of from $\geq 0.9:1$ to $\leq 10:1$, preferably from $\geq 0.95:1$ to $\leq 5:1$ and more preferably from $\geq 0.98:1$ to $\leq 3:1$.

The reaction of the polyester carboxylates with the epoxide is carried out in the presence of a catalyst which comprises at least one nitrogen atom in the molecule. The amount of this nitrogen-containing catalyst, based on the total weight of the reaction mixture, can be, for example, $\geq 10$ ppm to $\leq 10,000$ ppm, preferably $\geq 50$ ppm to $\leq 5,000$ ppm and more preferably $\geq 100$ ppm to $\leq 2,000$ ppm.

By the reaction of the carboxyl groups of the polyester with the epoxide, primary or secondary alcohols are formed by ring opening, depending on the site of the attack on the epoxide ring. Preferably, $\geq 80\%$, $\geq 90\%$ or $\geq 95\%$ of the carboxyl groups react with the epoxide and a content of secondary hydroxyl groups of from $\geq 50$ mol % to $\leq 100$ mol % or from $\geq 60$ mol % to $\leq 85$ mol % is preferably obtained.

The polyisocyanates of group B1) are initially not limited further with respect to the isomers of individual members of the group. Thus, for example, 2,4-TDI or 2,6-TDI and, in the case of MDI, the 2,2'-, 2,4'- and 4,4'-isomers can be employed. Polymeric MDI can contain, for example, 6, 7, 8, 9 or 10 MDI monomers.

The prepolymers mentioned in group B2) can be, for example, reaction products of the polyisocyanates B1) with polyester polyols A) or any other desired polyols.

The allophanates, ureas, biurets, isocyanurates, uretdiones and/or carbodiimides of the polyisocyanates B1) mentioned in group B3) can be derivatives of the individual polyisocyanates or also any desired mixed derivatives of the polyisocyanates among one another and with one another.

The carbodiimide/uretonimine derivatives of the polyisocyanates B1) mentioned in group B4) are obtained by heating the isocyanates with suitable catalysts, carbon dioxide being split off.

Catalysts from the phospholine oxide series are conventionally employed. For example, carbodiimides/uretonimines of 4,4'-MDI (Desmodur CD-S® from Bayer Material Science AG) are employed commercially.

The preparation of the polyurethane polymers by the process according to the invention can be carried out with the aid of the auxiliary substances and additives known to the person skilled in the art, such as, for example, water, blowing agents, emulsifiers, foam stabilizers, fillers etc. The conventional characteristic numbers for the ratio between NCO and OH groups, such as, for example, 95, 100 or 105, can furthermore be established.

In one embodiment of the process according to the invention, in the preparation of the polyester polyols A) the polyesters comprising carboxyl end groups are prepared by employing $\geq 1.03$ mol to $\leq 1.90$ mol of carboxyl groups or carboxyl group equivalents of an acid component per mol of hydroxyl groups of an alcohol. Due to the excess of the carboxyl groups or equivalents thereof, such as anhydrides, a by far predominant part of the end groups or even all of the end groups of the polyester are carboxyl groups. In the subsequent reaction with the epoxide, these can then be reacted further to give the corresponding alcohols. The excess of carboxyl groups can also be $\geq 1.04$ mol to $\leq 1.85$ mol or $\geq 1.05$ mol to $\leq 1.5$ mol per mol of hydroxyl groups.

In a further embodiment of the process according to the invention, in the preparation of the polyester polyols A) the polyester comprising carboxyl end groups is prepared directly before the reaction with the epoxide of the general formula (1). This means that the reaction with the epoxide using a catalyst having at least one nitrogen atom per molecule is carried out directly after the preparation of the polyester. The reaction is advantageously carried out by adding the epoxide to the reaction mixture from the polyester synthesis. This is advantageously carried out in the same production plant. Production time is saved in this manner.

In a further embodiment of the process according to the invention, in the preparation of the polyester polyols A) the polyester comprising carboxyl end groups is obtainable from the reaction of ethylene glycol and diethylene glycol and higher homologues thereof, 1,3-propanediol, 1,4-butanediol, 1,6-hexanediol, 1,8-octanediol, 1,10-decanediol, 1,12-dodecanediol, 2-methylpropane-1,3-diol, neopentyl glycol, 3-methylpentane-1,5-diol, glycerol, pentaerythritol and/or 1,1,1-trimethylolpropane with succinic acid, fumaric acid, maleic acid, maleic anhydride, glutaric acid, adipic acid, sebacic acid, 1,10-decanedicarboxylic acid, 1,12-dodecanedicarboxylic acid, phthalic acid, phthalic anhydride, isophthalic acid, terephthalic acid, pyromellitic acid, trimellitic acid and/or caprolactone.

In a further embodiment of the process according to the invention, in the preparation of the polyester polyols A) in the epoxide of the general formula (1) R1 is methyl, ethyl, n-propyl, iso-propyl, n-butyl, sec-butyl, iso-butyl, tert-butyl, cyclohexyl or phenyl. Preferably, R1 is methyl here. The epoxide employed is then propylene oxide.

In a further embodiment of the process according to the invention, in the preparation of the polyester polyols A) the reaction with the epoxide of the general formula (1) takes place at a temperature of from $\geq 70°$ C. to $\leq 150°$ C. The reaction temperature can preferably be $\geq 80°$ C. to $\leq 130°$ C.

In a further embodiment of the process according to the invention, the molar content of secondary hydroxyl groups in the polyester polyols is $\geq 50$ mol % to $\leq 100$ mol %. This is to be understood as meaning the molar content in the polyester polyol in total, that is to say not based on an individual molecule. It can be determined, for example, by means of $^1$H-NMR spectroscopy. The content can also be $\geq 60$ mol % to $\leq 99$ mmol %. The higher the content of secondary hydroxyl end groups in the polyester polyol, the slower the rate of reaction in the polyurethane preparation and the more possibilities emerge for varying the catalysts.

In a further embodiment of the process according to the invention, in the preparation of the polyester polyols A) the reaction of the polyester comprising carboxyl end groups with the epoxide of the general formula (1) is carried out in the presence of a catalyst which comprises at least one nitrogen atom per molecule.

With respect to the catalyst in the preparation of the polyester polyols A), it is possible, for example, for the catalyst to be chosen from the group comprising:
amines of the general formula (2):

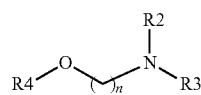

wherein:
R2 and R3 independently of each other are hydrogen, alkyl or aryl; or
R2 and R3 together with the N atom carrying them form an aliphatic, unsaturated or aromatic heterocycle;
n is an integer from 1 to 10, that is to say 1, 2, 3, 4, 5, 6, 7, 8, 9 or 10;
R4 is hydrogen, alkyl or aryl; or
R4 represents —$(CH_2)_x$—N(R41)(R42), wherein:
R41 and R42 independently of each other are hydrogen, alkyl or aryl; or
R41 and R42 together with the N atom carrying them form an aliphatic, unsaturated or aromatic heterocycle;
x is an integer from 1 to 10, that is to say 1, 2, 3, 4, 5, 6, 7, 8, 9 or 10;
amines of the general formula (3):

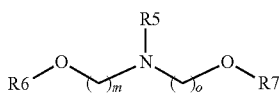

wherein:
R5 is hydrogen, alkyl or aryl;
R6 and R7 independently of each other are hydrogen, alkyl or aryl;
m and o independently of each other are an integer from 1 to 10, that is to say 1, 2, 3, 4, 5, 6, 7, 8, 9 or 10;
and/or:
diazabicyclo[2.2.2]octane, diazabicyclo[5.4.0]undec-7-ene, dialkylbenzylamine, dimethylpiperazine, 2,2'-dimorpholinyldiethyl ether and/or pyridine.

The catalysts mentioned can influence the reaction of the carboxyl groups with the epoxide in a manner such that a higher content of desired secondary OH end groups is obtained in the polyester polyol.

Amines of the general formula (2) can be described in the broadest sense as amino alcohols or ethers thereof. If R4 is hydrogen, the catalysts can be incorporated into a polyurethane matrix when the polyester polyol is reacted with a polyisocyanate. This is advantageous in order to prevent emergence of the catalyst, which in the case of amines may be accompanied by an adverse odour problem, on the polyurethane surface, so-called "fogging" or VOC (volatile organic compounds) problems.

Amines of the general formula (3) can be described in the broadest sense as amino (bis)alcohols or ethers thereof. If R6 or R7 are hydrogen, these catalysts can likewise be incorporated into a polyurethane matrix.

With respect to the catalyst in the preparation of the polyester polyols A), it is preferable, in the amine of the general formula (2), for R2 and R3 to be methyl, R4 to be hydrogen and n to be 2, or R2 and R3 to be methyl, R4 to be —$(CH_2)_2$—$N(CH_3)_2$ and n to be 2. Overall, either N,N-dimethylethanolamine or bis(2-(dimethylamino)ethyl)ether results.

With respect to the catalyst in the preparation of the polyester polyols A), it is furthermore preferable, in the amine of the general formula (3), for R5 to be methyl, R6 and R7 to be hydrogen, m to be 2 and o to be 2. Overall, N-methyldiethanolamine thus results.

In certain variants, such compounds can also be used as so-called blowing agent catalysts, that is to say they preferentially catalyse the reaction of the isocyanate groups with water to form carbon dioxide, and to a lesser extent also reaction thereof with hydroxyl groups to form urethane groups. This composition can therefore be directly employed further in the preparation of polyurethanes. N,N-Dimethylethanolamine, bis(2-(dimethylamino)ethyl)ether or N-methyldiethanolamine are preferred.

The amount of the catalyst compounds mentioned, relative to the polyol according to the invention, can be, for example, ≥10 ppm to ≤10,000 ppm, preferably ≥50 ppm to ≤5,000 ppm and more preferably ≥100 ppm to ≤2,000 ppm.

In a further embodiment of the process according to the invention, in the preparation of the polyurethane polymers catalysts comprising tin which have a content of from ≥5% by weight to ≤99% by weight of the total amount of catalyst used in the preparation of the polyurethane polymer are employed. Examples of such urethanization catalysts are, in addition to sulfur-containing compounds, such as di-n-octyltin mercaptide, preferably tin(II) salts of carboxylic acids, such as tin(II) acetate, tin(II) octoate, tin(II) ethylhexanoate and tin(II) laurate, and the tin(IV) compounds, such as dibutyltin oxide, dibutyltin dichloride, dibutyltin diacetate, dibutyltin dilaurate, dibutyltin maleate or dioctyltin diacetate. The amount of catalyst stated in % by weight relates to the catalyst as such and not to a catalyst composition employed, for example a solution of the catalyst in a solvent. The contents lacking to make up 100% by weight of the amount of catalyst can be made up of, for example, amine catalysts used in the preparation of such polyurethanes. It is preferable here for the content of amine catalysts to be as low as possible.

The content can also be in a range of from ≥6% by weight to ≤80% by weight or from ≥7% by weight to ≤50% by weight. In particular, a combination with amine catalysts, which chiefly drive the water reaction, also opens up for polyester polyurethane foams the possibility widely used in the field of polyether polyurethane foams of better coordination of the urethanization and the water reactions with one another.

In a further embodiment of the process according to the invention, the polyisocyanate B) is toluoylene-diisocyanate (TDI) with a content of the 2,4-isomer of from ≥75% by weight to ≤100% by weight. Preferably, this is the isomer mixture under the technical name T80, that is to say 2,4- and 2,6-TDI in the ratio of 80% by weight to 20% by weight, which is inexpensively commercially obtainable.

The present invention also provides a polyurethane polymer which is obtainable by a process according to the invention. Above all, it can be obtained by a process according to the invention. In the case in particular where the polyol used for the preparation originates from the reaction of a polyester comprising carboxyl end groups with propylene oxide, analysis can be carried out by means of an isocyanatolysis of the polyurethane. The characteristic signal of the methyl group which originates from the propylene oxide and is on the chain end of the polyol which, after the isocyanatolysis, is in the immediate vicinity of the urethane group can be detected here in the $^1$H-NMR spectrum (J. T. Mehl, R. Murgasova, X. Dong, D. M. Hercules and H. Nefzger; Analytical Chemistry (2000), 72(11), 2490-2498). Analogously, polyesters which have been obtained by ethoxylation of carboxyl end groups can also be detected for most cases. The only exception are those polyesters which have been built up using or co-using ethylene glycol.

In one embodiment of the polyurethane polymer according to the invention, this is present as a polyurethane flexible foam. Polyurethane flexible foams in the context of the present invention are those polyurethane polymers, and in particular foams, of which the bulk density according to DIN EN ISO 3386-1-98 is in the range of from $\geq 10$ kg/m$^3$ to $\leq 150$ kg/m$^3$ and of which the compressive strength according to DIN EN ISO 3386-1-98 is in the range of from $\geq 0.5$ kPa to $\leq 20$ kPa (at 40% deformation).

The present invention is explained further with the aid of the following examples. The materials and abbreviations used here have the following meaning and sources of supply:

Diethylene glycol (DEG): ex Ineos
1,1,1-Trimethylolpropane (TMP): ex Aldrich
Adipic acid: ex BASF
N-Methyldiethanolamine (MDEA): ex Aldrich
Desmophen VP-PU 60WB01: polyester polyol with exclusively primary OH end groups; ex Bayer MaterialScience
Silbyk 9100: polyether-modified polysiloxane; ex Byk
RCA 117: N,N'-dimethylpiperazine, marketed as RC-PU Activator 117/Addocat 117 ex Rheinchemie
Niax A30: approx. 50 wt. % solution of bis(2-(dimethylamino)ethyl)ether in isononylphenol ethoxylate; ex Momentive Performance Materials
Niax A1: 70 wt. % solution of bis(2-(dimethylamino)ethyl) ether in dipropylene glycol; ex Momentive Performance Materials
Dabco 33 LV: 33 wt. % solution of 2,2,2-diazabicyclooctane in propylene glycol; ex Aldrich
Addocat SO: tin 2-ethylhexanoate; ex Rheinchemie
Desmodur T80: 2,4- and 2,6-toluoylene-diisocyanate (TDI) in the ratio of 80:20; ex Bayer MaterialScience
Desmodur T65: 2,4- and 2,6-toluoylene-diisocyanate (TDI) in the ratio of 65:35; ex Bayer MaterialScience The analyses were carried out as follows:
Hydroxyl number: with the aid of the standard DIN 53240
Acid number: with the aid of the standard DIN 53402
Viscosity: MCR 51 rheometer from Anton Paar
Ratio of primary and secondary OH groups: by means of $^1$H-NMR (Bruker DPX 400, deuterochloroform)

1. Preparation of the Polyester Carboxylate PESC-1:

3,184 g (30.04 mol) of diethylene glycol, 349 g (2.06 mol) of 1,1,1-trimethylolpropane and 5,667 g (38.82 mol) of adipic acid were initially introduced, while covering with a blanket of nitrogen, into a 4 liter 4-necked flask equipped with a heating mushroom, mechanical stirrer, internal thermometer, 40 cm packed column, column head, descending intensive condenser and membrane vacuum pump and were heated to 200° C. in the course of 1 hour, while stirring, water being distilled at an overhead temperature of 100° C. The internal pressure was then lowered slowly to 15 mbar in the course of 90 minutes and the reaction was brought to completion for a further 24 hours. The mixture was cooled and the following properties were determined:
Analysis of the Polyester Carboxylate PESC-1:
Hydroxyl number: 0.3 mg of KOH/g
Acid number: 70.3 mg of KOH/g
Viscosity: 1,620 mPas (75° C.)

2. Preparation of the Polyester Carboxylate PESC-2:

242.6 kg (2,287 mol) of diethylene glycol, 26.5 kg (197.8 mol) of 1,1,1-trimethylolpropane and 431.8 kg (2,957 mol) of adipic acid were initially introduced, while covering with a blanket of nitrogen, into a 1,000 liter stirred tank equipped with an internal thermometer, 250 cm packed column, distillation bridge, descending intensive condenser and with a water ring pump and were heated to 200° C. in the course of 5 hours, while stirring, water being distilled at an overhead temperature of 100° C. The internal pressure was then lowered slowly to 15 mbar in the course of 3 hours and the reaction was brought to completion for a further 24 hours. The mixture was cooled and the following properties were determined:
Analysis of the Polyester:
Hydroxyl number: 0.4 mg of KOH/g
Acid number: 67.0 mg of KOH/g
Viscosity: 1,750 mPas (75° C.)

3. Preparation of the Polyester Polyol PESP-1:

174.05 g of the polyester carboxylate PESC-1 from Example 1 and 0.20 g (1,000 ppm with respect to the total mixture) of MDEA were initially introduced into a 500 ml glass pressure reactor under an inert gas (nitrogen) and were then heated up to 125° C. 25.95 g of propylene oxide were then metered in over a period of 195 minutes, the reactor pressure being kept at 4.2 bar (absolute). After an after-reaction time of 60 minutes at 125° C., while stirring, readily volatile contents were distilled off at 90° C. (1 mbar) and the reaction mixture was then cooled to room temperature. The following properties were determined:
Analysis of the Polyester Polyol PESP-1:
Hydroxyl number: 65.8 mg of KOH/g
Acid number: 0.04 mg of KOH/g
Viscosity: 15,790 mPas (75° C.)
OH groups 1°/2° [mol/mol]: 32/68

Practically completely carboxyl end groups and no hydroxyl end groups are present in the polyester carboxylate PESC-1 from Example 1 employed. This can be seen with the aid of the hydroxyl numbers after the reaction to give the polyester, which are below 1 mg of KOH/g. The reaction of the polyester carboxylates with the epoxide likewise proceeds practically quantitatively on all the carboxyl groups of the polyester carboxylate. The conversion can be seen from the low acid number and from the hydroxyl number, which corresponds well with the original acid number of the polyester carboxylate PESC-1. One OH group was thus formed per carboxyl group. The catalyst MDEA makes is possible to obtain the desired secondary OH end groups in a content of 68%.

4. Preparation of the Polyester Polyol PESP-2:

12,845 g of the polyester carboxylate PESC-2 from Example 2 and 12.6 g (863 ppm with respect to the total mixture) of MDEA were initially introduced into a 20 l steel pressure reactor under an inert gas (nitrogen) and were then heated up to 125° C. 1,741 g of propylene oxide were then metered in over a period of 110 minutes, the reactor pressure rising from initially 1.2 bar (absolute) to 5.1 bar (absolute). After an after-reaction time of 120 minutes at 125° C., while stirring, readily volatile contents were distilled off in vacuo at 125° C. for 30 minutes and the reaction mixture was then cooled to room temperature.

The properties of the polyester polyols obtained are reproduced in Table 1.

TABLE 1

| Example number | 3 (PESP-1) | 4 (PESP-2) |
|---|---|---|
| Polyester carboxylate | PESC-1 | PESC-2 |
| Polyester carboxylate [g] | 174.05 | 12845 |
| Catalyst | MDEA | MDEA |
| Amount of catalyst [ppm] | 1,000 | 863 |
| Propylene oxide [g] | 25.95 | 1,741 |
| Metering time [min] | 195 | 110 |
| After-reaction [min] | 60 | 120 |
| Hydroxyl number [mg of KOH/g] | 65.8 | 63.5 |
| Acid number [mg of KOH/g] | 0.04 | 0.05 |
| Viscosity [mPas, 25° C.] | 15,790 | 19,895 |
| OH groups 1°/2° [mol/mol] | 32/68 | 32/68 |

5. Production of Polyurethane Flexible Foams

The starting substances listed in the examples according to Table 2 were reacted with one another in the test batches PU-1, PU-2 and PU-3 in the conventional method of processing for the production of polyurethane foams by the one-stage process. Batches PU-1 and PU-3 are comparison examples. Table 2 also shows the results for the batches.

TABLE 2

| | | | PU-1 | PU-2 | PU-3 |
|---|---|---|---|---|---|
| Formulation | Desmophen VP.PU 60WB01 (comparison) | [pt. by wt.] | 100 | | 100 |
| | PESP-1 (according to the invention) | [pt. by wt.] | | 100 | |
| | Water weighed | [pt. by wt.] | 3.00 | 3.00 | 3.00 |
| | Water total | [pt. by wt.] | 3.00 | 3.00 | 3.00 |
| | Silbyk 9100 | [pt. by wt.] | 1.00 | 1.00 | 1.00 |
| | RCA 117 | [pt. by wt.] | 0.25 | | |
| | Niax A30 | [pt. by wt.] | 0.25 | | |
| | Niax A1 | [pt. by wt.] | | 0.10 | 0.10 |
| | Dabco 33LV | [pt. by wt.] | | 0.20 | 0.20 |
| | Addocat SO | [pt. by wt.] | | 0.10 | 0.10 |
| | TDI 1: | [pt. by wt.] | 38.31 | 39.16 | 38.31 |
| | Desmodur T80 | [pt. by wt.] | 19.15 | 39.16 | 38.31 |
| | Desmodur T65 | [pt. by wt.] | 19.15 | | |
| | Characteristic number | | 100 | 100 | 100 |
| Processing | Starting time | [s] | 15 | 18 | 10 |
| | Rising time | [s] | 85 | 95 | 120 |
| Properties | Cell structure | | fine | fine | * |
| | Bulk density (DIN EN ISO 3386-1-98) | [kg/m³] | 42 | 41 | * |
| | Tensile strength (DIN EN ISO 1798) | [kPa] | 137 | 127 | * |
| | Elongation at break (DIN EN ISO 1798) | [%] | 190 | 210 | * |
| | Compressive strength (DIN EN ISO 3386-1-98) | [kPa] | 6.1 | 5.4 | * |
| | Compression set at 90% compression (DIN EN ISO 1856-2000) | [%] | 2.9 | 3.3 | * |

* In this batch a shrinkage of the polyurethane flexible foam was observed. The properties were therefore not determined.

It can be seen that in the foams which are not according to the invention, which were produced using the polyol Desmophen VP.PU 60WB01, with a 1:1 mixture of 2,4-TDI:2,6-TDI of 80:20 (T80) and 2,4-TDI:2,6-TDI of 65:35 (T65), a usable polyurethane flexible foam is obtained (PU-1). This is not the case when pure T80 is employed. On the other hand, a polyurethane flexible foam PU-2 produced according to the invention is also obtained using pure T80.

The advantage of the process according to the invention, according to which polyurethane foams can be obtained even if only the isocyanate quality T80 is used instead of the two qualities of T80 and T65 hitherto conventionally necessary, manifests itself here. There is firstly an economic advantage, since T80 in general is less expensive than T65. This furthermore also means that the flexibility of ester flexible foam recipes becomes greater inasmuch as, depending on the availability or cost of the isocyanates, alternatives are opened up in the choice of the isocyanate.

Due to the specific polyols in the process according to the invention, it is also possible to employ a certain amount of tin catalysts as a partial substitute for amine catalysts. This has a favourable effect on the adverse properties caused by high amounts of amine catalyst, such as, for example, smell or ageing properties.

The invention claimed is:
1. A process for preparing a polyurethane polymer, comprising reacting
   A) a polyester polyol having secondary hydroxyl end groups, which are obtained from the reaction of a polyester comprising carboxyl end groups with an epoxide of the general formula (1):

(1)

wherein R1 represents an alkyl radical or an aryl radical and wherein the polyester comprising carboxyl end groups has an acid number of from 25 to 400 mg of KOH/g and a hydroxyl number of less than or equal to 5 mg of KOH/g
with
   B1) a polyisocyanate selected from the group consisting of toluylene-diisocyanate, diphenylmethane-diisocyanate, polymeric diphenylmethane-diisocyanate, xylylene-diisocyanate, naphthylene-diisocyanate, hexamethylene-diisocyanate, diisocyanatodicyclohexylmethane, isophorone-diisocyanate and mixtures thereof;
   B2) a prepolymer of the polyisocyanates mentioned in B1);
   B3) an allophanate, urea, biuret, isocyanurate, uretdione and/or carbodiimide of the polyisocyanates mentioned in B1); and/or
   B4) a carbodiimide/uretonimine derivative of the polyisocyanates mentioned in B1),
wherein the polyurethane polymer is a polyurethane flexible foam, and wherein the polyurethane polymer has a compressive strength according to DIN EN ISO 3386-1-98 of from ≥0.5 kPa to ≤20 kPa (at 40% deformation).

2. The process according to claim 1, wherein the polyesters comprising carboxyl end groups are prepared by employing from 1.03 to 1.90 mol of carboxyl groups or carboxyl group equivalents of an acid component per mol of hydroxyl groups of an alcohol.

3. The process according to claim 1, wherein the polyester comprising carboxyl end groups is prepared directly before the reaction with the epoxide of the general formula (1).

4. The process according to claim 1, wherein the polyester comprising carboxyl end groups is obtained from the reaction of a compound selected from the group consisting of ethylene glycol, diethylene glycol, higher homologues thereof, 1,3-propanediol, 1,4-butanediol, 1,6-hexanediol, 1,8-octanediol, 1,10-decanediol, 1,12-dodecanediol, 2-methylpropane-1,3-diol, neopentyl glycol, 3-methylpentane-1,5-diol, glycerol, pentaerythritol, 1,1,1-trimethylolpropane, and combinations thereof
with
a compound selected from the group consisting of succinic acid, fumaric acid, maleic acid, maleic anhydride, glutaric acid, adipic acid, sebacic acid, 1,10-decanedicarboxylic acid, 1,12-dodecanedicarboxylic acid, phthalic acid, phthalic anhydride, isophthalic acid, terephthalic acid, pyromellitic acid, trimellitic acid, caprolactone, and combinations thereof.

5. The process according to claim 1, wherein in the epoxide of the general formula (1) R1 represents methyl, ethyl, n-propyl, iso-propyl, n-butyl, sec-butyl, iso-butyl, tert-butyl, cyclohexyl or phenyl.

6. The process according to claim 1, wherein in the preparation of the polyester polyols A) the reaction with the epoxide of the general formula (1) takes place at a temperature of from 70 to 150° C.

7. The process according to claim 1, wherein the molar content of secondary hydroxyl groups in the polyester polyols A) is from 50 to 100 mol %.

8. The process according to claim 1, wherein in the preparation of the polyester polyols A) the reaction of the polyester comprising carboxyl end groups with the epoxide of the general formula (1) is carried out in the presence of a catalyst which comprises at least one nitrogen atom per molecule.

9. The process according to claim 8, wherein the catalyst comprises one or more compounds selected from the group consisting of:
amines of the general formula (2):

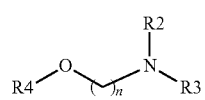

(2)

wherein:
R2 and R3 independently of each other represent hydrogen, alkyl or aryl; or
R2 and R3 together with the N atom carrying them form an aliphatic, unsaturated or aromatic heterocycle;
n represents an integer from 1 to 10;
R4 represents hydrogen, alkyl or aryl; or
R4 represents —(CH$_2$)$_x$—N(R41)(R42), wherein:
R41 and R42 independently of each other represent hydrogen, alkyl or aryl; or
R41 and R42 together with the N atom carrying them form an aliphatic, unsaturated or aromatic heterocycle;
x represents an integer from 1 to 10;
amines of the general formula (3):

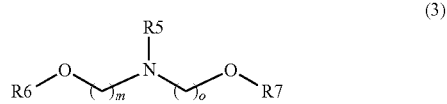

(3)

wherein:
R5 represents hydrogen, alkyl or aryl;
R6 and R7 independently of each other represent hydrogen, alkyl or aryl;
m and o independently of each other represent an integer from 1 to 10;
and
diazabicyclo[2.2.2]octane, diazabicyclo[5.4.0]undec-7-ene, dialkylbenzylamine, dimethylpiperazine, 2,2'-dimorpholinyldiethyl ether and pyridine.

10. The process according to claim 9, wherein in the amine of the general formula (2) R2 and R3 are methyl, R4 is hydrogen and n=2, or R2 and R3 are methyl, R4 is —(CH$_2$)$_2$—N(CH$_3$)$_2$ and n=2.

11. The process according to claim 9, wherein in the amine of the general formula (3) R5 is methyl, R6 and R7 are hydrogen, m=2 and o=2.

12. The process according to claim 1, wherein in the preparation of the polyurethane polymer a catalyst comprising tin which has a content of from 5 to 99% by weight of the total amount of catalyst used in the preparation of the polyurethane polymer are employed.

13. The process according to claim 1, wherein the polyisocyanate B) comprises toluylene-diisocyanate with a content of the 2,4-isomer of from 75 to 100% by weight.

14. A polyurethane polymer obtained by the process according to claim 1.

15. The process according to claim 1, wherein the polyisocyanate B1) is toluylene-diisocyanate with a content of the 2,4-isomer of from 75 to 100% by weight.

16. The process according to claim 1, wherein the polyisocyanate B1) is mixture of 2,4-TDI: 2,6-TDI of 80: 20.

* * * * *